United States Patent [19]
Schultheis

[11] Patent Number: 5,960,679
[45] Date of Patent: Oct. 5, 1999

[54] RATCHETING OPEN-END WRENCH

[76] Inventor: William M. Schultheis, 1937 Clemens Dr., Placentia, Calif. 92870

[21] Appl. No.: 09/006,532

[22] Filed: Jan. 13, 1998

[51] Int. Cl.⁶ .............................. B25B 13/00; B25B 13/52
[52] U.S. Cl. ................................. 81/58.2; 81/58; 81/65.2; 81/68; 81/186
[58] Field of Search ................................ 81/58.2, 58, 64, 81/65.2, 68, 179, 186

[56] References Cited

U.S. PATENT DOCUMENTS

| | | | |
|---|---|---|---|
| 4,440,047 | 4/1984 | Robbins | 81/179 |
| 4,488,459 | 12/1984 | Bailey et al. | 81/58.2 |
| 5,282,830 | 2/1994 | Reynolds | 81/90.1 |
| 5,456,143 | 10/1995 | Stanton | 81/179 |

Primary Examiner—David A. Scherbel
Assistant Examiner—Philip J. Hoffmann
Attorney, Agent, or Firm—Robert D. Fish; Crockett & Fish

[57] ABSTRACT

A ratcheting, open-end wrench concurrently engages more than half the corners of a nub during torquing. In preferred embodiments a wrench has a contacting cavity for receiving and torquing a nut, bolt head or other angularized nub. A chain carries a plurality of teeth about the inner perimeter of the cavity, and the chain is ratcheted so that the teeth move readily in one direction, but can be blocked from moving in the opposite direction. The teeth are arranged on the chain such that the cavity changes shape from an open configuration in which the nub can be received into the cavity, and a closed configuration in which the nub is locked into the cavity.

17 Claims, 6 Drawing Sheets

5,960,679

RATCHETING OPEN-END WRENCH

FIELD OF THE INVENTION

Torque application tools

BACKGROUND OF THE INVENTION

Known wrenches can be divided into two categories, closed-end wrenches and open-end wrenches. As the terms are used herein, closed-end wrenches are those which must be applied axially to a nut, bolt head, or other torque receiving surface, while open-end wrenches are those which can be applied either axially or radially to a torque receiving surface.

Torque receiving surfaces themselves also generally break down into two categories, those having relatively smooth exteriors such as pipes or dowels, and those having defined sides and corners, such as nuts or bolt heads. With respect to torque receiving surfaces having defined sides and corners, the surfaces may or may not protrude from the body of the component, but in all cases the defined sides and corners would cooperate to form what is referred to herein as a nub. It will also be appreciated that the corners of a nub may be square or have some other angle, depending in general on whether the nub has four or more sides. As the term is used herein, a corner includes "rounded" or "non-sharp" corners as well as typical "sharp" corners.

Closed-end wrenches typically have four to eight contact faces, and are usually designed to contact all torque receiving surfaces at the same time. Such wrenches are typified by common box or socket type wrenches. Closed-end wrenches are often coupled to a ratcheting mechanism, which permits turning of a nub through more than 360° without removing the wrench from the nub and without moving the wrench handle through more than 360°.

Open-end wrenches typically have only about three to five contact surfaces. This allows the wrench to engage an object from the side, but also generally precludes the wrench from engaging all the torque receiving surfaces or corners at the same time. Thus, for example, a typical open-end wrench never engages more than one half the corners of a nub at any given time, even though the wrench may engage two thirds of the sides of the nub (as in a hexagonal nub) or even three fifths of the sides (as in a pentagonal nub).

This limited-surface engagement problem has been addressed with respect to smooth torque receiving surfaces by increasing the number of contacting faces on the wrench, and by providing mechanisms that partially enwrap the torque receiving surfaces during torquing. Examples include U.S. Pat. No. 1,364,582 to Reed, U.S. Pat. No. 716,914 to Mahlen, U.S. Pat. No. 1,675,748 to Bunker, and U.S. Pat. No. 2,784,628 to Meredeth. Significantly, this approach is inapplicable to nub-type torque receiving surfaces because operation of the wrenches include slipping of the contacting surfaces over the torque receiving surfaces, and such slipping would tend to round off the corners of the nubs.

The need to retain the integrity of the corners of nubs generally requires repeated engagement and disengagement of an open-end wrench from a nub to achieve large nub rotation. This engagement/disengagement problem has been addressed to some extent by carrying nub engaging teeth or faces on a moving chain or a plurality of rotating gears (see U.S. Pat. No. 2,353, 642 to Buice, U.S. Pat. No. 5,249,487 to Armfield respectively). The problem has also been addressed by employing teeth that pivot or reciprocate within a narrow range. Examples are U.S. Pat. No. 4,644,830 to Balley et al., U.S. Pat. No. 3,906,822 to Hertelendy et al., and U.S. Pat. No. 4,327,610 to Chiarenza. None of these solutions, however, has been completely satisfactory because they cannot also address the limited-surface engagement problem. Thus, there remains a need to provide an open-end wrench which is capable of engaging more than half of the torque receiving corners of a nub while still providing a ratcheting feature.

SUMMARY OF THE INVENTION

The present invention provides apparatus and methods in which a ratcheting, open-end wrench concurrently engages more than half the corners of a nub during torquing.

In preferred embodiments a wrench has a contacting cavity for receiving and torquing a nut, bolt head or other angularized nub. A chain carries a plurality of teeth about the inner perimeter of the cavity, and the chain is ratcheted so that the teeth move readily in one direction, but can be blocked from moving in the opposite direction. The teeth are arranged on the chain such that the cavity changes shape from an open configuration in which the nub can be received into the cavity, and a closed configuration in which the nub is locked into the cavity.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 9b is a second schematic of the preferred chain locking assembly of FIG. 9a;

FIG. 10b is a second schematic providing a bottom view of the preferred chain tensioning assembly of FIG. 10a;

DETAILED DESCRIPTION

Figure 1:
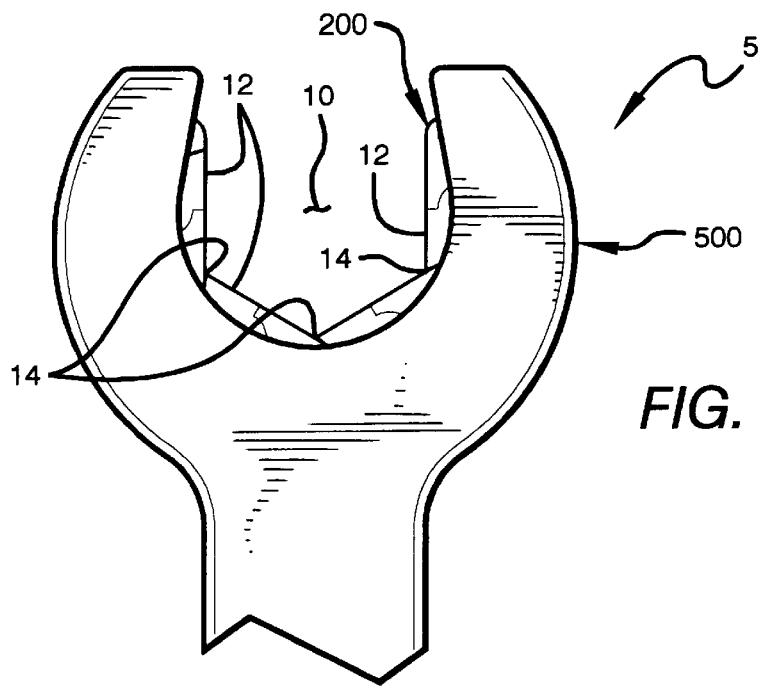
FIG. 1 is a perspective view of a first wrench embodying the invention in an open configuration.
Figure 2:
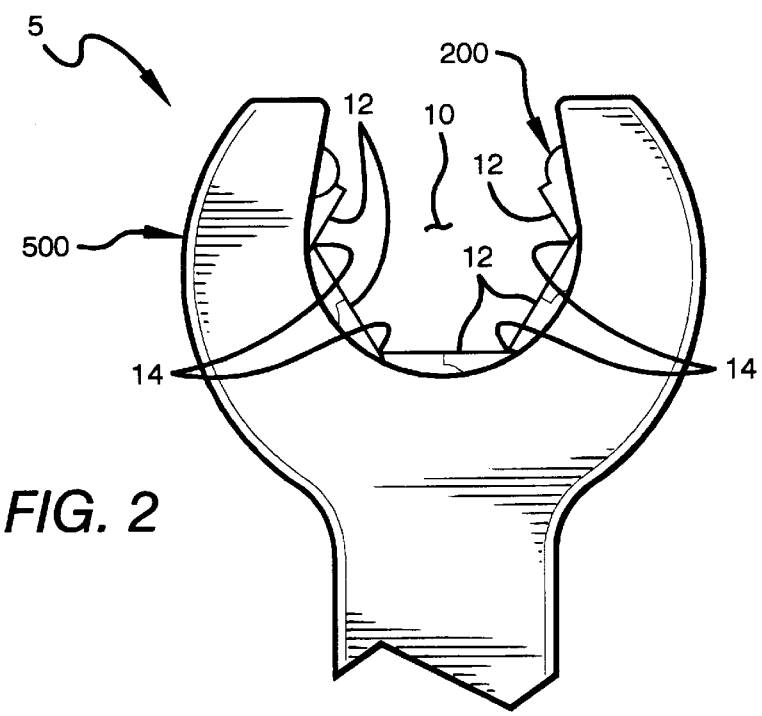
FIG. 2 is a perspective view of a first wrench embodying the invention in a closed configuration.

In FIG. 1 a first wrench 5 has a housing assembly 500 and a nub receiving cavity 10, which is depicted in an open configuration. In this embodiment the nub receiving cavity has an inner perimeter defined by a chain 200. FIG. 2 illustrates the same wrench in a closed configuration. As can be seen in FIG. 1, while in the open configuration the chain 200 defines a nub receiving cavity 10 having a shape similar to that found in a typical open-end wrench, i.e. that of four sides of a hexagon. While in the open position, a nub 50, having the shape shown in FIG. 3, can be received into the nub receiving cavity 10 such that the nub's torque receiving sides 52, and two of the nub's torque receiving corner's 54, are contacted by the contacting sides 12 and contacting corners 14 of the nub receiving cavity 10. In FIG. 1, each contacting side 12 comprises two links 210 of chain 200.

In FIG. 2, the chain 200 defines a nub receiving cavity 10 having the shape of a hexagon with one complete side and two half sides removed, resulting in a total of five contacting sides 12 and four contacting corners 14. While in the closed configuration, the nub receiving cavity has sufficient contacting corners 14 to engage more than half of the torque receiving corners of a nub, and a nub within the nub receiving cavity would therefore be locked into the cavity.

In the open configuration of FIG. 1, since each corner of a hexagon is a 120° angle, the sum of the differences resulting from subtracting the corner angles from 180° is 60° times the number of corners which equals 180°. In the closed configuration of FIG. 2, since each corner of a hexagon is a 120° angle, the sum of the differences resulting from subtracting the corner angles from 180° is 60° times the number of corners which equals 240°.

Figure 4:
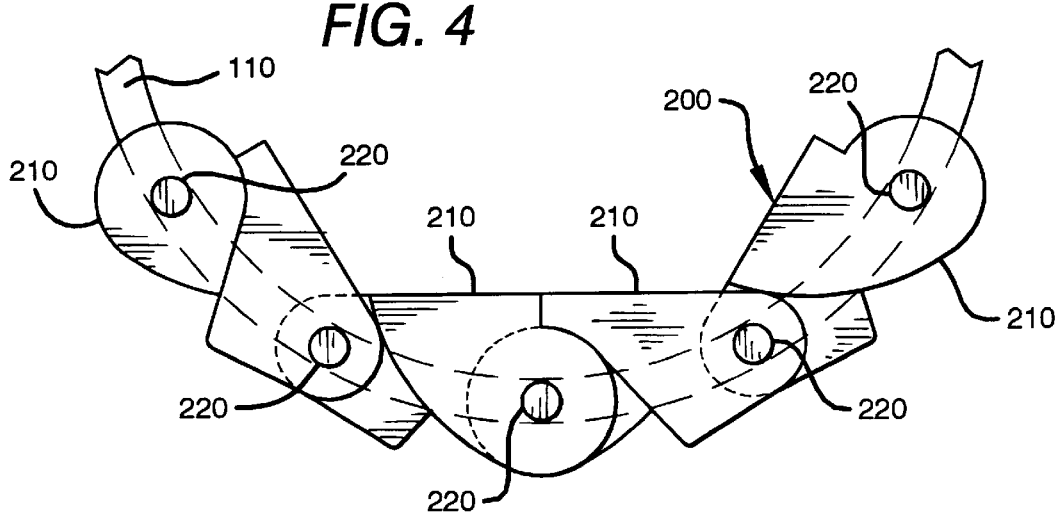
FIG. 4 is a schematic of a chain according to the claimed invention.

In FIG. 4 a schematic chain 200 comprises multiple links 210 linked together with chain link pins 220 positioned within chain link pin channel 110. Although it is preferred to use a chain to define the nub receiving cavity, other alternatives are contemplated as well. One possible alternative would be to use a cable to interconnect the links while still providing guide pins on the links to allow them to be properly positioned. Another alternative would be to use multiple independent pieces to define the nub receiving cavity.

Figure 5:
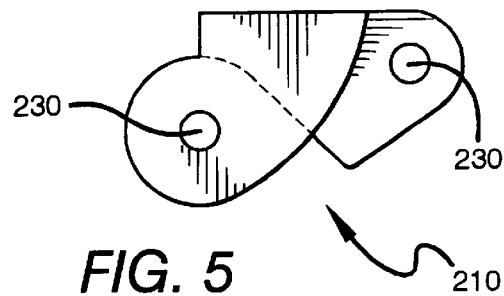
FIG. 5 is a schematic of an individual link of the chain according to the claimed invention.

In FIG. 5 an individual link 210 of the chain 200 has a preferred shape as shown, and chain link pin insertion points 230. The preferred link 210 is a solid piece but alternatives such as the use of multiple layers of link plates are considered as well. Moreover, although the depicted shape is preferred, any shape which allows proper positioning of the link when used in conjunction with the chain positioning assembly would be acceptable. One such variation includes manufacturing the links as flat pieces, and alternating the positions of the links from one side of the chain to the other when assembling the chain.

Figure 6:
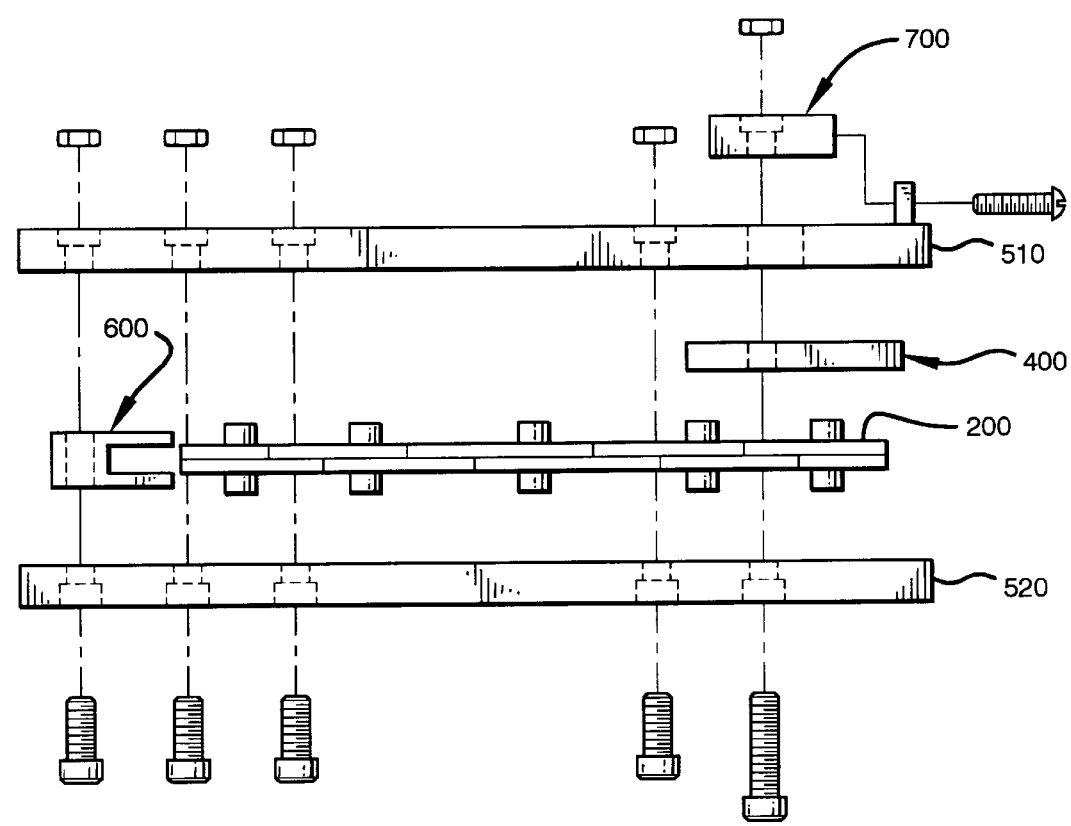
FIG. 6 is a schematic of a wrench which is a preferred embodiment of the claimed invention.

FIG. 6 depicts the relationship of housing assembly pieces 510 and 520, chain 200, a chain positioning assembly 400, a chain locking assembly 600, and a chain tensioning assembly 700.

Figure 7:
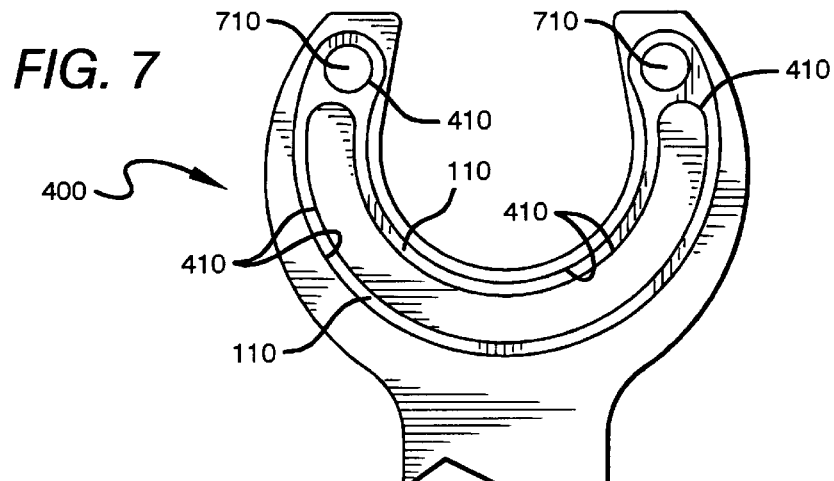
FIG. 7 is a schematic of a preferred chain positioning assembly according to the claimed invention.

In FIG. 7 a preferred chain positioning assembly 400 according to the claimed invention comprising multiple chain link pin guide surfaces 410 which define chain link pin channel 110. Alternative chain positioning assemblies are contemplated as well. One such would be to surfaces which guided the links of the chains rather than the pins linking the links of the chain.

Figure 8:
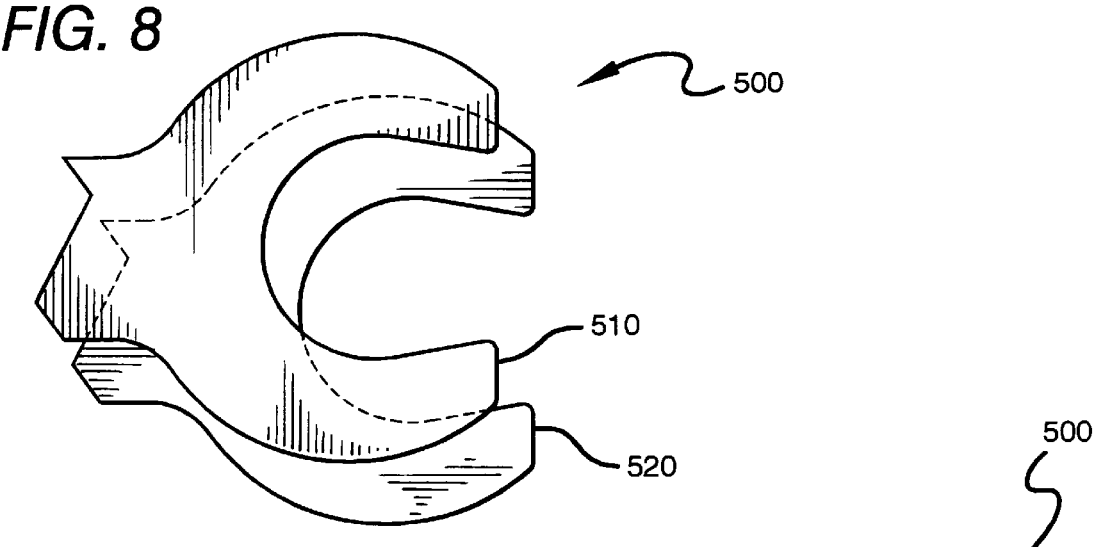
FIG. 8 is a schematic of a preferred housing assembly according to the claimed invention.

In FIG. 8 a preferred housing assembly 500 according to the claimed invention has two pieces 510 and 520. An integral portion of housing assembly 500 is chain positioning assembly 400 (shown in FIG. 7) comprising multiple chain positioning surfaces 410 on both housing pieces 510 and 520. Although it is preferred that the chain positioning assembly be an integral portion of the housing assembly, variations are also contemplated. One possible variation would be to provide a single piece housing with a hollow core so that the chain positioning assembly and the chain could be inserted into it.

Figure 9A:
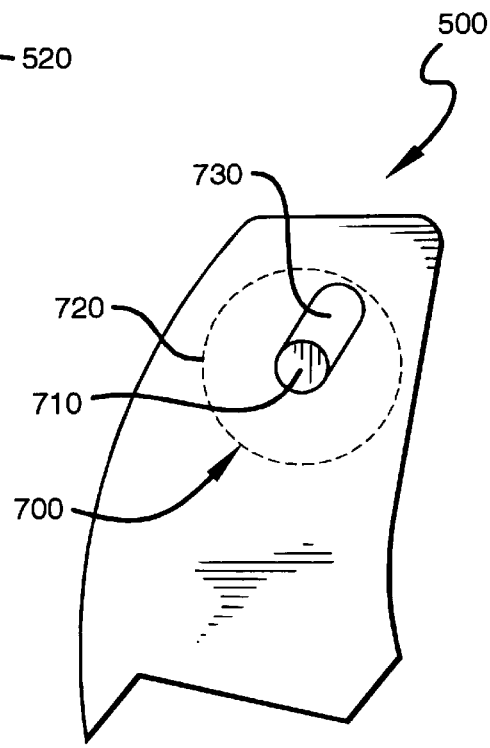
FIG. 9a is a first schematic of a preferred chain locking assembly according to the claimed invention.
Figure 9B:
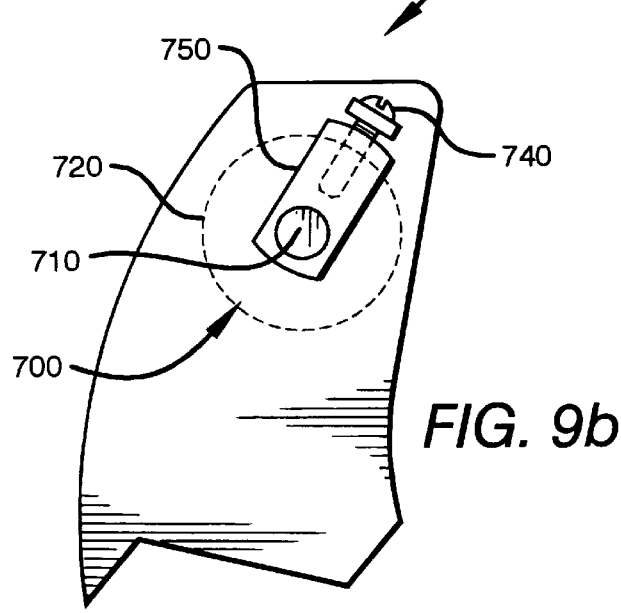

In FIG. 9a and FIG. 9b a preferred chain tensioning assembly 700 according to the claimed invention comprises an axis pin 710, a cylinder 720, an axis pin adjustment screw 740, and an axis pin adjustment bracket 750. Turning adjust screw 740 changes the position of cylinder 720 by repositioning axis pin 710 within an axis pin channel 730. Cylinder 720 also serves as a chain link pin guide surface 410. It is contemplated that chain tensioning assembly 700 might be replaced by other known chain tensioning methods.

Figure 10A:
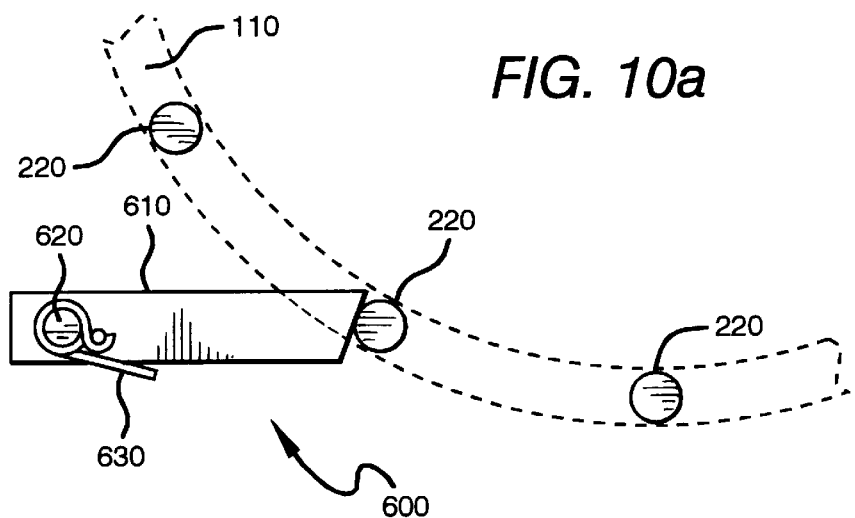
FIG. 10a is a first schematic providing a side view of a preferred chain tensioning assembly according to the claimed invention.
Figure 10B:
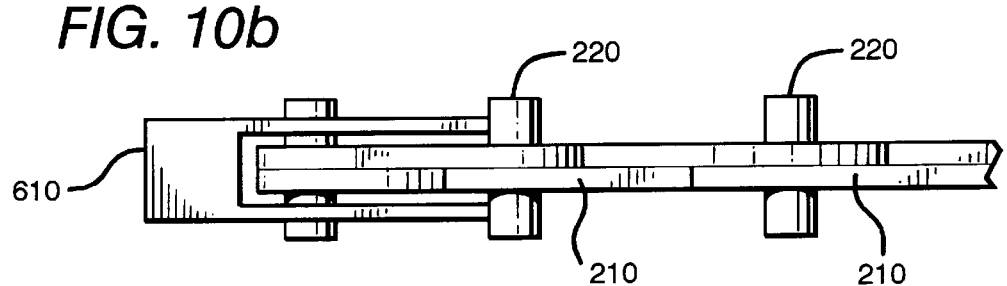

In FIG. 10a and FIG. 10b a preferred chain locking assembly 600 according to the claimed invention comprises a pawl 610, pawl pin 620, and pawl positioning spring 630. Although only a single pawl contacting the link pins is shown, other alternatives are contemplated as well such as having multiple pawls, having pawls which contact the chain links directly, and utilizing a sprocket and pawl combination to replace the pawl.

Figure 3:
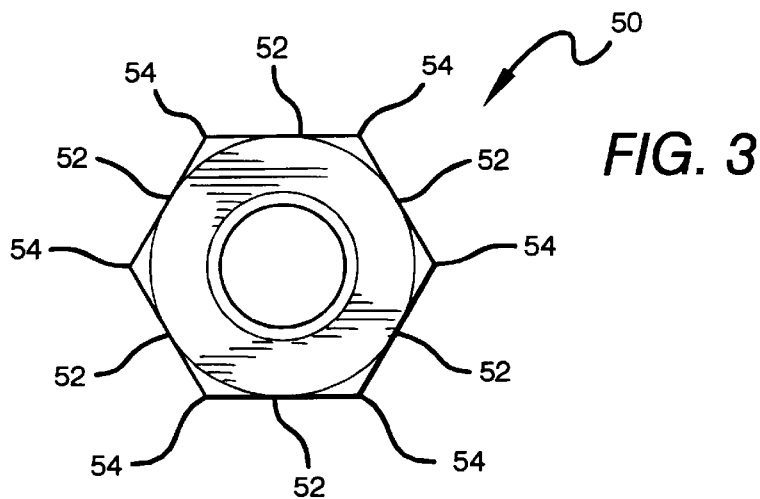
FIG. 3 is a plan view of a nub.
Figure 11A:
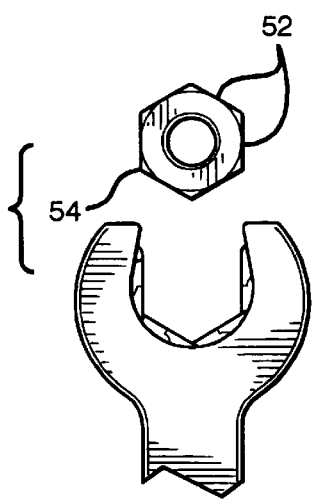
FIG. 11a is the first of a series of 10 schematics illustrating a first method of use of an embodiment of the claimed invention.
Figure 11B:
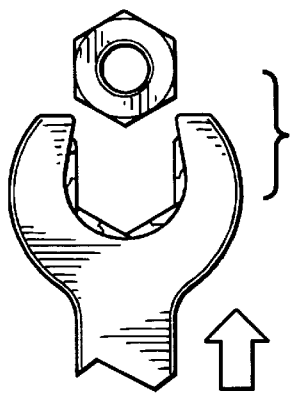
FIG. 11b is the second of a series of 10 schematics illustrating a first method of use of an embodiment of the claimed invention.
Figure 11C:
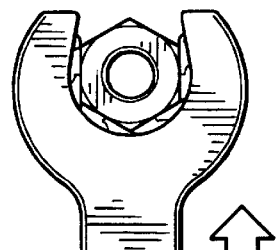
FIG. 11c is the third of a series of 10 schematics illustrating a first method of use of an embodiment of the claimed invention.
Figure 11D:
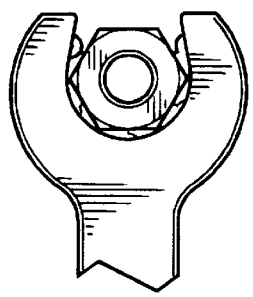
FIG. 11d is the fourth of a series of 10 schematics illustrating a first method of use of an embodiment of the claimed invention.
Figure 11E:
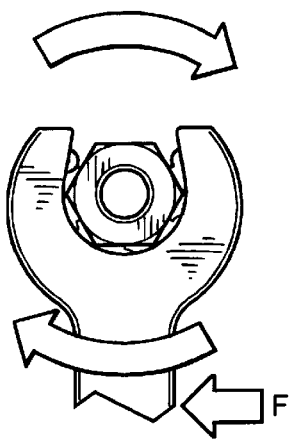
FIG. 11e is the fifth of a series of 10 schematics illustrating a first method of use of an embodiment of the claimed invention.
Figure 11F:
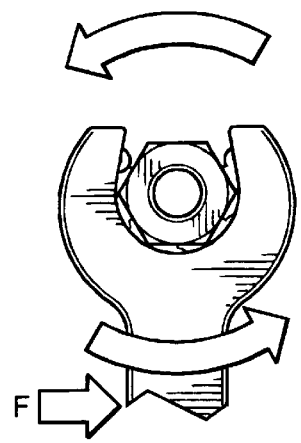
FIG. 11f is the sixth of a series of 10 schematics illustrating a first method of use of an embodiment of the claimed invention.
Figure 11G:
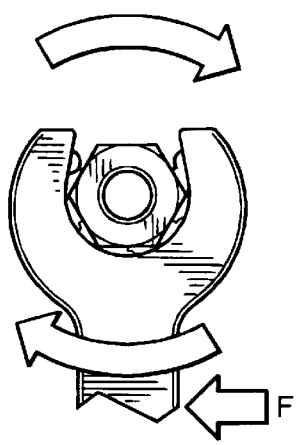
FIG. 11g is the seventh of a series of 10 schematics illustrating a first method of use of an embodiment of the claimed invention.
Figure 11H:
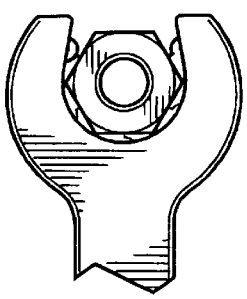
FIG. 11h is the eighth of a series of 10 schematics illustrating a first method of use of an embodiment of the claimed invention.
Figure 11I:
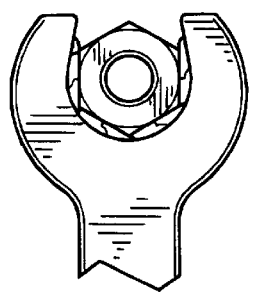
FIG. 11i is the ninth of a series of 10 schematics illustrating a first method of use of an embodiment of the claimed invention.
Figure 11J:
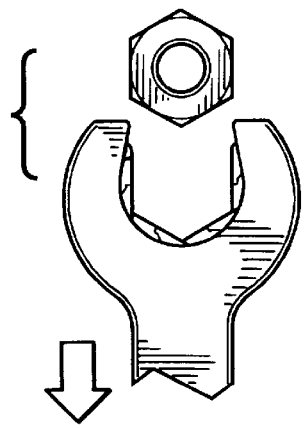
FIG. 11j is the tenth of a series of 10 schematics illustrating a first method of use of an embodiment of the claimed invention.

FIGS. 11a through 11i are a series of perspective views illustrating a first method for using the wrench of FIG. 1 to tighten a nub as in FIG. 3. In the FIG. 11a, a wrench 5 according to the claimed invention is brought near to the torque receiving sides 52 and corners 54 of a nub, in this case the outer hexagonal surface a hex nut. In FIG. 11b, the wrench is being slid radially onto the hex nut. In FIG. 11c the nut is completely within the nub receiving cavity, and the wrench is about to be rotated to lock the nut into place. In FIG. 11d, the nut is locked within the nub receiving cavity, and the nub receiving cavity is in a closed configuration, i.e. the wrench cannot be removed from the nut by sliding it off of the nut in a radial direction. In FIG. 11e, force is being applied to the wrench, causing the nut to turn. In FIG. 11f, force is being applied to the wrench opposite the direction used to turn the nut, causing the chain to move and the wrench to rotate around the nut. In FIG. 11g, force is again being applied to the wrench so as to cause the nut to turn. In FIG. 11h, the wrench is returned to its starting position, while in FIG. 11i, the nut is unlocked from the wrench.

Although force is often applied to the wrench while the nub receiving cavity is in a closed configuration, force can also be applied while the nub receiving cavity is in an open configuration.

It is preferred that various types of steel be used to form the parts of the wrench but the material used is not thought to be critical to the claimed subject matter. Any material can be used for a particular part so long as that part retains the ability to function as designed.

It is also contemplated that the methods and apparatus will find application to wrenches and nubs of many sizes and configurations including wrenches having nub receiving cavities with inside diameters greater than 4 inches, less than or equal to 4 inches, and less than ¼ inch.

Thus, specific embodiments and applications of wrenches have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. An open-end wrench for torquing a nub, the wrench comprising a nub receiving cavity having a plurality of nub contacting sides, the cavity changing shape from an open configuration in which the nub can be received into the cavity, and a closed configuration in which the nub is locked into the cavity wherein said cavity has an inner perimeter, and further comprising a chain carrying a plurality of teeth about said inner perimeter.

2. The wrench of claim 1 further comprising a ratchet that allows the teeth to move readily in one direction, but can be blocked from moving in an opposite direction.

3. The wrench of claim 2 wherein the cavity changes shape as a function of the movement of the teeth.

4. The wrench of any one of claims 1, 2 or 3 wherein the nub has a plurality of torque receiving faces, adjacent said faces being joined at corners, and the closed configuration of the cavity engages more than half the corners so as to at least intermittently contact both joined faces of each engaged corner.

5. A ratcheting, open-end wrench comprising a cavity for applying torque to an object at a plurality of outside corners of the object, the cavity having a plurality of sides forming inside corners, each of a plurality of the inside corners simultaneously receiving an outside corner of the object, and each inside corner defining an inside angle, wherein, when the number of inside angles receiving an outside corner of the object is more than half the number of outside corners of the object, the sum of the differences resulting from subtracting each of the corner angles of the plurality of inside corners receiving an outside corner of the object from 180° is greater than 180°.

6. The wrench of claim 5 wherein the sum of the differences resulting from subtracting each of the corner angles from 180° is greater than 180° during the application of torque.

7. The wrench of claim 5 wherein at least one of the sides is defined by at least two translating members.

8. The wrench of claim 5 wherein each of the sides is defined by at least two translating members.

9. The wrench of claim 7 wherein the at least two translating members are links of a chain.

10. The wrench of claim 5 wherein at least one of the sides is at least partially defined by at least two links of a chain.

11. The wrench of claim 5 wherein each of the sides is at least partially defined by at least two links of a chain.

12. The wrench of any of claims 5–11 wherein the cavity has an inside diameter measurement greater than four inches.

13. The wrench of any of claims 5–11 wherein the cavity has a maximum inside diameter measurement less than ¼ inch.

14. A method of torquing a nub having at least four sides and outside corners, comprising:

providing a wrench with a cavity having a plurality of nub contacting sides, at least two of the sides defined by at least two members carried by a chain;

coupling a ratchet to the chain;

manipulating the chain to produce a first open configuration of the cavity and receiving the nub into the cavity;

manipulating the chain to produce a closed configuration of the cavity;

rotating the wrench to torque the nub;

manipulating the chain to produce a second open configuration of the cavity and withdrawing the nub from the cavity.

15. The method of claim 14 wherein the step of manipulating the chain to produce a closed configuration comprises providing the cavity with a plurality of inside corners, each defining an inside angle for receiving an outside corner of the nub, wherein, when the number of inside angles receiving an outside corner of the nub is more than half the number of outside corners of the nub, the sum of the differences resulting from subtracting each of the corner angles from 180° is greater than 180°.

16. The method of any of claims 14-15 further comprising providing the cavity with an inside diameter measurement greater than 4 inches.

17. The method of any of claims 14-15 further comprising providing the cavity with a maximum inside diameter measurement less than ¼ inches.

* * * * *